United States Patent Office 3,676,299
Patented July 11, 1972

3,676,299
MICROBIAL PRODUCTION OF NOVEL HYDROXY-PHENYL KETOBUTYRIC ACIDS
Richard L. Raymond, Wilmington, Del., assignor to Sun Research and Development Co., Philadelphia, Pa.
No Drawing. Original application Nov. 28, 1967, Ser. No. 686,329. Divided and this application Oct. 22, 1970, Ser. No. 83,152
Int. Cl. C12d 1/00
U.S. Cl. 195—28 R                5 Claims

ABSTRACT OF THE DISCLOSURE

Novel hydroxyphenylketobutyric acids having the structural formula:

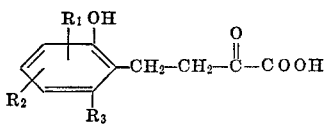

wherein $R_1$ and $R_2$ are hydrogen or lower alkyl groups having from one to three carbon atoms; $R_3$ is hydrogen, and wherein $R_1$ and $R_2$ may be the same or different, are prepared by subjecting naphthalene or alkyl-substituted naphthalenes having the structural formula:

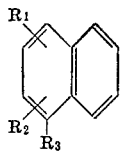

wherein $R_1$, $R_2$ and $R_3$ are as defined above, to the oxidizing activity of the microorganisms *Nocardia coeliaca*, ATCC No. 21,146, *Nocardia nov.* sp., ATCC No. 21,145, or *Streptomyces* species, ATCC No. 21,147.

CROSS-REFERENCE TO RELATED APPLICATION

This is a division of application Ser. No. 686,329, filed Nov. 28, 1967 now U.S. Pat. 3,592,846.

BACKGROUND OF THE INVENTION

This invention relates to novel hydroxyphenylketobutyric acids and processes for preparing the same by subjecting naphthalene or alkyl-substituted naphthalenes to the fermentative action of certain microorganisms which are characterized not only by their ability to split one of the aromatic rings of the naphthalene nucleus, but also by their capability of oxidizing the opened hydrocarbon chain to form valuable new organic acids. The novel hydroxyphenylketobutyric acids of this invention are useful as plant growth regulators, per se, and as intermediates in the preparation of other plant growth regulators. These latter compounds, i.e. 2-carboxybenzo-γ-pyrans, may be prepared from the compounds of the present invention or their alkyl esters by first enolizing them with heat followed by dehydration with heat to form the lactone derivative in accordance with the following reaction scheme:

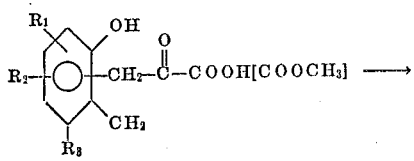

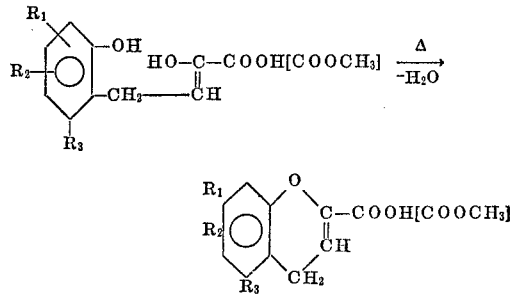

wherein $R_1$ and $R_2$ are hydrogen or lower alkyl; and wherein $R_3$ is hydrogen.

The oxidation of cyclic hydrocarbons by microbiological means to form more valuable organic compounds is generally known in the art, as taught for example in U.S. Pat. No. 3,057,784 where the side chains of alkyl-substituted cyclic compounds are oxidized to form the corresponding organic acids. Similar procedures using paraffin hydrocarbons are likewise known. In each instance, however, the effect of the various organism on each type of substrate is generally quite specific, and thus it is not possible to predict from any of these prior art teachings what effect, if any, a given organism will have on a particular substrate, especially a highly stable condensed aromatic such as the naphthalenes of the present invention.

SUMMARY OF THE INVENTION

In accordance with the present invention there are now provided novel hydroxyphenylketobutyric acid compounds which are prepared by subjecting naphthalene or alkylsubstituted naphthalenes to the novel ring-splitting and oxidizing activity of certain strains of microorganisms. More particularly, this invention relates to 4-(2-hydroxyphenyl)-2-ketobutyric acid compounds having the formula:

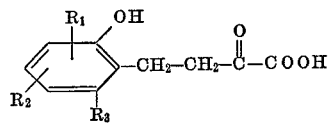

wherein $R_1$ and $R_2$ are hydrogen or lower alkyl; $R_3$ is hydrogen; and $R_1$ and $R_2$ may be the same or different, which compounds are prepared by subjecting naphthalenes of the formula:

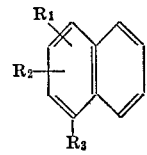

wherein $R_1$, $R_2$, and $R_3$ are as defined above, to the fermentative action of certain microorganisms of the genus Nocardia or Streptomyces.

DESCRIPTION OF THE PREFERRED EMBODIMENTS

The hydroxyphenylketobutyric acids of this invention are readily prepared by first fermenting a suitable microorganism in a growth medium containing water, available oxygen, a carbon-energy source for the organism other than the naphthalene substrate, and other essential nutrients for the adequate growth of the organism; thereafter feeding the naphthalene substrate to the growing organism and allowing the fermentation to continue for a time sufficient to convert the naphthalene compound to the corresponding hydroxyphenylketobutyric acid.

In preparing a suitable microorganism for use in the present process, a sample of one of the selected species is desirably transferred from an agar slant to a shake flask containing a nutritionally adequate medium, including a carbon source on which the organism can be grown. In some cases it may be desirable also to have an additional growth-stimulating material present such as peptone, beef extract, yeast extract or the like, although the addition of such materials is not essential. The mixture is then incubated at about 30° C. while a carbon source is added periodically. Either during or after an incubation of about 24 to 48 hours, the naphthalene substrate may be added incrementally to the shake flask. In certain preferred instances, depending upon the activity of the microorganism, the naphthalene may be added to the shake flask at the beginning of the growth period.

The nutrient medium into which the selected organism is inoculated must contain as mentioned above, in addition to inorganic nutrients and a source of nitrogen, a carbon source which also provides the organism with its energy. While in general any organic substance containing a combined source of carbon and hydrogen, preferably other than the naphthalene substrate, can be used, as for example, carbohydrates or fatty acids, it is preferred that hydrocarbons, and particularly n-paraffins having from 1 to 30 carbon atoms, such as n-butane, n-dodecane, or n-hexadecane, be employed, and especially the latter compound. Alternatively, depending upon the strain of organism which is selected, aromatic hydrocarbons such as benzene or p-xylene may be utilized instead. The carbon source, as for example n-hexadecane, may be added in one batch just prior to inoculation of the medium. Preferably, however, it should be added periodically in small increments throughout the entire course of the fermentation in order to avoid concentrations of this material in the medium which would be toxic to the organism. Although the amount to be added at any given time may vary, depending upon the organism, it is generally desirable to provide incrementally not more than about one gram per liter for a total of about twenty grams per liter for any given fermentation batch.

The source of nitrogen which is to be included in the nutrient medium can be any inorganic or organic nitrogen-containing compound which is capable of providing nitrogen in a form suitable for metabolic utilization by the microorganisms such as proteins, amino acids, ammonium sulfate, ammonium phosphate, urea or the like.

The inorganic nutrients should be water soluble and provide an adequate source of minerals, preferably in the form of their salts such as iron, sodium and phosphorus compounds. One example of a nutritionally adequate medium, in addition to the carbon-energy source, is as follows:

| | Grams per liter of water |
|---|---|
| Urea | 2.0 |
| Yeast extract (Difco) | 0.5 |
| $MgSO_4 \cdot 7H_2O$ | 0.2 |
| $Na_2CO_3$ | 0.1 |
| $CaCl_2 \cdot 2H_2O$ | 0.01 |
| $MnSO_4 \cdot H_2O$ | 0.02 |
| $FeSO_4 \cdot 7H_2O$ | 0.005 |
| $KH_2PO_4$ | 0.8 |
| $Na_2HPO_4$ | 1.2 |

Oxygen can be introduced into the fermentation medium in any form which can be conveniently assimilated by the organism. Preferably, the oxygen should be supplied in the form of a gas, either by bubbling oxygen or air through the liquid medium, or by vigorous agitation of the medium, or both.

The temperature at which the fermentation is conducted, both before and after the addition of the substrate, can be varied from about 20° C. to 40° C., and preferably is from 28° C. to 32° C. to insure adequate growth of the organism. The pH of the fermentation medium should be maintained within a range of from 3.5 to 8.5, and preferably 5.0 to 7.0. Adjustments are often necessary during the course of the fermentation in order to keep the pH within the preferred ranges. Following the initial introduction of the naphthalene substrate to the established fermentation medium, the period of fermentation constituting the second stage of the process should continue for about 24 to 168 hours, and preferably for about 24 to 48 hours.

The naphthalene substrate utilized as the starting material in the preparation of the ketobutyric acids of this invention may, as mentioned above, be either naphthalene or an alkyl-substituted naphthalene. In the latter case, it is essential that all of the alkyl substituents be distributed on only one of the two condensed aromatic rings. Thus, there may be employed as specific starting materials for the process of this invention, in addition to naphthalene itself, such alkyl-substituted compounds as 1-methylnaphthalene, 2-methylnaphthalene, 1,2-dimethylnaphthalene, 1,3-dimethylnaphthalene, 2,3-dimethylnaphthalene, 2-ethylnaphthalene and the like.

When the aforementioned compounds are subjected to the action of a suitable ring-splitting and oxidizing organism, there are obtained as the corresponding products such compounds as 4-(2-hydroxyphenyl)-2-ketobutyric acid,
4-(3-methyl-2-hydroxyphenyl)-2-ketobutyric acid,
4-(4-methyl-2-hydroxyphenyl)-2-ketobutyric acid,
4-(3,4-dimethyl-2-hydroxyphenyl)-2-ketobutyric acid,
4-(3,5-dimethyl-2-hydroxyphenyl)-2-ketobutyric acid,
4-(4-ethyl-2-hydroxyphenyl)-2-ketobutyric acid and the like.

The naphthalene is desirably added periodically to the fermentation medium in small increments throughout the total fermentation period, together with the aforementioned carbon source such as n-hexadecane. Although it may be added in dry, solid form, it is preferred that it be dispersed in the medium as a molten liquid in fine droplet form. The amount of each portion which is added to the medium is generally in the amount of ten grams per liter, for a total of 100 to 150 grams per liter of medium.

As a further embodiment of this invention it is desirable, although not essential, that the fermentation be carried out in the presence of an ion exchange resin, preferably a weakly basic anion exchange resin which can be added directly to the fermentation medium. One such example of this latter type of resin if IR-45 (Rohm & Haas, Philadelphia, Pa.) which, when added to the medium adsorbs the elaborated ketobutyric acid product in situ and thereby facilitates recovery of the product from the fermentation broth. Thus, the resin may be readily filtered from the broth, at the end of the fermentation period, washed, and eluted with a solvent such as 5% NaOH in water to recover the adsorbed product therefrom. The eluate may then be acidified with HCl to pH 2.0 extracted with ether, and the crude product dissolved in cyclohexane to crystallize out the pure 2-ketobutyric acid.

Alternatively, in the absence of an ion exchange resin, the acid may conveniently be recovered directly from the fermentation broth by separating the cells from the broth after acidification to pH 2.0 by centrifugation or filtration, followed by treatment of the filtrate with amyl acetate or diethyl ether.

Suitable organisms which may be used to convert the naphthalene substrate to the corresponding ketobutyric acid may readily be isolated and identified by conventional growth and assay methods such as are described herein. Three such microorganisms which have been found to provide suitable yields of 4-(2-hydroxyphenyl)-2-ketobutyric acids have been isolated by soil sprinkle plate techniques, and identified as follows on the basis of the classifications in Bergey's Manual.

(1) *Nocardia coeliaca*, ATCC No. 21,146, which was isolated from a Florida soil sample on mineral agar, using a mixture of naphthalene and n-hexadecane as the growth substrate;

(2) *Nocardia nov.* sp., ATCC No. 21,145, which was isolated from a Canadian soil sample on a mineral agar medium, using a mixture of p-xylene and n-hexadecane as the growth substrate;

(3) *Streptomyces* sp., ATCC No. 21,147 which was isolated from a Florida sand which had been treated with naphthalene; n-hexadecane was the only growth substrate added to the mineral agar.

The cultural and physiological characteristics on which the classification of the above organisms was based are as follows:

TABLE I
*Nocardia coeliaca*, ATCC Number 21,146

| | | |
|---|---|---|
| Doreset egg medium: | | |
| Age | 4 days | 8 days. |
| Chromogenesis | Buff | Orange. |
| Consistency | Dry, wrinkled | Dry. |
| Action of sugars: | | |
| Age | 4 days | |
| Maltose | Growth | Alkaline. |
| Sorbitol | do | |
| Dextrose | do | Do. |
| Mannitol | do | |
| Lactose | do | |
| L-arabinose | do | |
| Succharose | do | Do. |
| Levulose | do | |
| Inositol | do | |
| Gelatin stab | No growth or liquefaction. | |
| Nitrate reduction | Negative. | |
| Kligler's: | | |
| Slant | No reaction. | |
| Butt | Do. | |
| H₂S | Do. | |
| Action on milk | 4 days—Very slight alkaline. | |
| Urease | Negative. | |
| Catalase | Positive. | |
| Amylase | Negative. | |
| O₂ needs | Aerobic. | |
| Carbon source | Phenol, naphthalene. | |
| Nitrogen source | Ammonium salts. | |
| Gram stain: | | |
| Reaction | Gram positive. | |
| Form | ROD with a lot of branching. | |
| Arrangement | F, Y, and V. | |
| Size | {8 hours—0.30–0.6×14–16μ. 24 hours—0.6–0.7×4–7μ. | |
| Motility—non-motile. | | |
| Nutrient agar plate: | | |
| Age | 6 days. | |
| Form | Circular. | |
| Elevation | High convex. | |
| Surface | Smooth. | |
| Margin | Filamentous. | |
| Chromogenesis | White. | |
| Size | 1 mm. | |
| Nutrient agar stroke: | | |
| Age | 6 days. | |
| Form | Echinulate. | |
| Consistency | Dry. | |
| Nutrient broth: | | |
| Surface growth | Flocculent. | |
| Amount of growth | Turbid. | |
| Sediment | Heavy, white. | |
| Loeffler's blood agar: | | |
| Age | 4 days | 8 days. |
| Growth | Dry, wrinkled | Dry, grainy. |
| Chromogenesis | Buff | Tan. |
| Potato slant: | | |
| Age | 6 days. | |
| Chromogenesis | Buff. | |
| Consistency | Dry. | |

TABLE II
*Nocardia nov.* Sp. ATCC No. 21,145

| | | |
|---|---|---|
| Gram stain: | | |
| Reaction | Gram positive. | |
| Form | Rod, much branching. | |
| Arrangement | F, Y, V. | |
| Size | {8 hours—0.9×9–13μ. 24 hours—0.9×3–5 μ. | |
| Motility. | | |
| Nutrient agar plate: | | |
| Age | 6 days. | |
| Form | Circular. | |
| Elevation | High convex. | |
| Surface | Smooth, dry. | |
| Margin | Filamentous. | |
| Chromogenesis | White. | |
| Size | 2 mm. | |
| Nutrient: | | |
| Age | 6 days. | |
| Form | Echinulate. | |
| Consistency | Dry. | |
| Nutrient broth: | | |
| Surface growth | Flocculent. | |
| Amount of growth | | |
| Sediment | Heavy. | |
| Loeffler's blood agar: | | |
| Age | 4 days. | |
| Growth | Dry, grainy. | |
| Chromogenesis | Buff. | |
| Potato slant: | | |
| Age | 6 days. | |
| Chromogenesis | Buff. | |
| Consistency | Dry. | |
| Doreset egg medium: | | |
| Age | 4 days | 8 days. |
| Chromogenesis | Buff | Orange. |
| Consistency | Butyrous | Butyrous. |
| Action of sugars: | | |
| Age | 4 days | |
| Maltose | Growth | Alkaline. |
| Sorbitol | do | |
| Dextrose | do | Do. |
| Mannitol | do | |
| Lactose | do | |
| L-arabinose | do | |
| Saccharose | do | Do. |
| Levulose | do | Do. |
| Inositol | do | |
| Gelatin stab | No growth—No liquefaction. | |
| Nitrate reduction | Negative. | |
| Kligler's: | | |
| Slant | Alkaline. | |
| Butt | | |
| H₂S | Negative. | |
| Action on milk | 8 days—Complete reduction of litmus. | |
| O₂ needs | Aerobic. | |
| Urease | Negative. | |
| Catalase | Positive. | |
| Amylase | Negative. | |
| Indole | Do. | |
| Carbon source | Phenol, naphthalene. | |
| Nitrogen source | Ammonium salts. | |

Streptomyces species, ATCC No. 21,147

| | |
|---|---|
| Vegetative growth | Flat, light cream. No diffusible pigment. |
| Aerial mycelium | White, very short. Ellipsoidal spores in loose chains. |
| Mineral agar | Flat white growth, brittle. Grows well on n-hexadecane and naphthalene—slight growth on benzene and cyclohexane. |
| Source | Isolated from soil. |
| Habitat | Soil. |

The following examples specifically illustrate various embodiments of this invention. Product analyses were done by U.V. spectroscopy. Identification of the specific products was based on data obtained from U.V., I.R. and mass spectral procedures.

Example 1

This example illustrates the oxidation of naphthalene to 4·(2-hydroxyphenyl)-2-ketobutyric acid by *Nocardia coeliaca* ATCC No. 21,146, using n-hexadecane as a growth substrate. A commercially available 7.5 liter fermenter was employed. To it was added three liters of a medium of the following composition:

| | Grams per liter of water |
|---|---|
| Urea | 2.0 |
| Yeast extract (Difco) | 0.5 |
| $MgSO_4 \cdot 7H_2O$ | 0.2 |
| $Na_2CO_3$ | 0.1 |
| $CaCl_2 \cdot 2H_2O$ | 0.01 |
| $MnSO_4 \cdot H_2O$ | 0.02 |
| $FeSO_4 \cdot 7H_2O$ | 0.005 |
| $KH_2PO_4$ | 0.8 |
| $Na_2HPO_4$ | 1.2 |

This medium was inoculated with 300 milliliters of *Nocardia coeliaca* which had been grown for 72 hours on a medium of similar composition using n-hexadecane as the growth substrate.

During the entire fermentation period, 31 grams of n-hexadecane was added incrementally for cell growth. Agitation was provided at 1000 r.p.m. and air was incorporated at 520 milliliters per minute. After 72 hours of growth on n-hexadecane, 48 grams of napthalene was added incrementally for the remainder of the fermentation period of 96 hours. At the time of initial napthalene addition, 200 milliliters of a weakly basic anion exchange resin IR-45 (Rohm and Haas), prepared in the phosphate form was added to the fermentation mixture. Additional resin was added at 24 hour intervals until a total of 600 milliliters was present in the fermentation. This fermentation was carried out at 30° C.

The fermentation was stopped after 168 hours. Assay of the fermentation broth and resin by U.V. methods revealed that 18 grams of the product, 4-(2-hydroxyphenyl)-2-ketobutyric acid, was present. The cells and broth were separated from the resin by decantation and discarded. The resin was eluted by the usual procedure with 5% NaOH in water. This eluate was then acidified with HCl to pH 2.0 and extracted with diethyl ether. After removal of the ether with a gentle stream of $N_2$ on a steam table, the resulting crude product was dissolved in boiling cyclohexane. After cooling overnight, 10 grams of crystalline product was obtained which was sparingly soluble in $CCL_4$ or cyclohexane but very soluble in cold water. M.P. 110–111° C.

*Analysis.*—Calcd. for $C_{10}H_{10}O_4$ (percent): C, 61.85; H, 5.15; O, 33.0. Found (percent): C, 61.65; H, 5:38; O, 33.48. Neutralization equivalent: Calculated, 194; found, 197.

In accordance with the above procedure, but starting with 1-methylnaphthalene instead of naphthalene, there is obtained 4-(3-methyl-2-hydroxyphenyl)-2-ketobutyric acid.

Example II

This example illustrates the production of 4-(2-hydroxyphenyl)-2-ketobutyric acid from naphthalene by *Nocardia nov.* sp. ATCC 21,145, using cerelose (a commercial sugar) as a growth substrate. This fermentation was carried out in Fernbach flasks containing 500 milliliters of medium of the following composition:

| | Grams per liter of water |
|---|---|
| $NH_4NO_3$ | 2.0 |
| $MgSO_4 \cdot 7H_2O$ | 0.8 |
| $Na_2HPO_4$ | 0.6 |
| $KH_2PO_4$ | 0.4 |
| Cerelose | 2.5 |

After inoculation with 50 milliliters of a 48-hour culture, incubation of the flasks was carried out at 30° C. on a gyratory shaker. The pH was maintained at 7.0 with 10% NaOH for the first 48 hours of growth.

Naphthalene (30 grams) and cerelose (5 grams) additions were made incrementally over the 140-hour fermentation period. After the first 48 hours, $CaCO_3$ was used to maintain the pH at 5.5–6.0.

At the conclusion of the fermentation, the mixture was acidified to pH 2.0 and the cells and residual naphthalene removed by filtration. The clarified broth was assayed by U.V. methods and found to contain 11.5 grams of product. The broth was extracted in the manner described in Example I.

In accordance with the above procedure, but starting with 1,2-dimethylnaphthalene instead of naphthalene, there is obtained 4-(3,4-dimethyl-2-hydroxyphenyl)-2-ketobutyric acid.

Similarly, in accordance with the above procedure, but starting with 1,3-dimethylnaphthalene instead of naphthalene, there is obtained 4-(3,5-dimethyl-2-hydroxyphenyl)-2-ketobutyric acid.

Example III

This example illustrates the oxidation of naphthalene to 4-(2-hydroxyphenyl)-2-ketobutyric acid by *Nocardia coeliaca* ATCC No. 21,146, *Streptomyces* sp. ATCC No. 21,147, and *Nocardia nov.* sp. ATCC 21,145, using a solid medium containing an ion exchange resin. The composition of the medium is the same as in Example I, except that agar (Difco) was added to a concentration of 15 grams per liter. The medium, after proper sterilization, was then poured into petri dishes to which two milliliters of anion exchange resin IR–45 (phosphate form) had been added. After solidification the plates were inoculated by spreading a heavy suspension of cells on the surface of the plates. These cells had been grown on plates of similar composition using n-hexadecane as a growth substrate. The plates were then inverted and a filter paper disc of a size that just fits inside the plate cover is inserted to hold the n-hexadecane and naphthalene. After incubating at 30° C. for 10 days, the agar and resin were removed from the petri plate, suspended in 50 milliliters of water and heated to melt the agar. This melted agar was then decanted from the resin, the resin washed three times with hot water and finally suspended in 100 milliliters of 5% HCl in methanol. Assay of the methanol solution by U.V. methods revealed the following concentrations of product:

| | Milligrams per plate |
|---|---|
| *Nocardia nov.* sp., ATCC No. 21,145 | 162.0 |
| *Streptomyces* sp., ATCC No. 21,147 | 57.5 |
| *Nocardia coeliaca*, ATCC No. 21,146 | 104.0 |

In accordance with the foregoing procedure, but starting with 2,3-dimethylnaphthalene instead of naphthalene, there is obtained 4-(4,5-dimethyl-2-hydroxyphenyl)-2-ketobutyric acid.

Similarly, in accordance with the above procedure, but starting with 2-ethylnaphthalene, there is obtained 4-(4-ethyl-2-hydroxyphenyl)-2-ketobutyric acid.

What is claimed is:

1. A process for the preparation of a 4-(2-hydroxyphenyl)-2-ketobutyric acid which comprises subjecting a naphthalene compound of the formula:

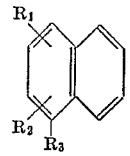

wherein $R_1$ and $R_2$ are selected from the group consisting of hydrogen and lower alkyl groups having from one to three carbon atoms; and $R_3$ is hydrogen, to the fermentative activity of a ring-splitting and hydrocarbon microorganism selected from the group consisting of:

*Nocardia coeliaca*, ATCC No. 21,146
*Nocardia nov.* sp., ATCC No. 21,145
*Streptomyces* sp., ATCC No. 21,147 to form a compound having the structural formula:

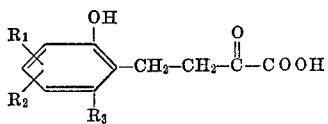

wherein $R_1$, $R_2$, and $R_3$ are as defined above and recovering said ketobutyric acid from the fermentation broth.

2. The proces according to claim 1 wherein the fermentation is carried out in the presence of an ion-exchange resin.

3. The process according to claim 1 wherein the process is carried out in the presence of a carbon source selected from the group consisting of n-paraffins and carbohydrates.

4. The process according to claim 3 wherein the n-paraffin is n-hexadecane.

5. The process according to claim 1 wherein naphthalene is converted to 4-(2-hydroxyphenyl)-2-ketobutyric acid.

References Cited
UNITED STATES PATENTS 3,419,469    12/1968    Humphrey et al. _____ 195—28 R ALVIN E. TANENHOLTZ, Primary Examiner